(12) United States Patent
Wilson et al.

(10) Patent No.: US 12,455,346 B2
(45) Date of Patent: Oct. 28, 2025

(54) ASSURANCE MONITORING OF RADAR SYSTEMS

(71) Applicant: Rockwell Collins, Inc., Cedar Rapids, IA (US)

(72) Inventors: Brandon E. Wilson, Portland, OR (US); Carlo L. Tiana, Portland, OR (US); Jeffery A. Finley, Cedar Rapids, IA (US); Brian O. Helfrecht, Batavia, IL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 347 days.

(21) Appl. No.: 17/727,326

(22) Filed: Apr. 22, 2022

(65) Prior Publication Data

US 2023/0341515 A1    Oct. 26, 2023

(51) Int. Cl.
*G01S 7/40* (2006.01)
*H01Q 3/26* (2006.01)

(52) U.S. Cl.
CPC .............. *G01S 7/40* (2013.01); *G01S 7/4008* (2013.01); *H01Q 3/267* (2013.01)

(58) Field of Classification Search
CPC .......... G01S 7/40; G01S 7/4008; H01Q 3/267
See application file for complete search history.

(56) References Cited

U.S. PATENT DOCUMENTS

| | | |
|---|---|---|
| 5,081,460 A | 1/1992 | Liu |
| 5,412,414 A * | 5/1995 | Ast ................ G01S 7/4017 342/372 |
| 9,780,447 B2 | 10/2017 | Maca et al. |
| 10,955,548 B1 | 3/2021 | Jinkins et al. |
| 2007/0210959 A1 | 9/2007 | Herd et al. |
| 2009/0058715 A1 | 3/2009 | Sarafian |

(Continued)

FOREIGN PATENT DOCUMENTS

| | | | |
|---|---|---|---|
| CN | 110474697 A | 11/2019 | |
| WO | WO-2020003743 A1 * | 1/2020 | ............ G01S 13/42 |
| WO | 2021115599 A1 | 6/2021 | |

OTHER PUBLICATIONS

European Examination Report received in EP Application No. 23169544.6, Nov. 11, 2024, 10 pages.

(Continued)

*Primary Examiner* — Calvin Y Choi
*Assistant Examiner* — Brandon James Henson
(74) *Attorney, Agent, or Firm* — Suiter Swantz IP (57) ABSTRACT

A system and method for performing a self-diagnostic test on an electronically scanned array is disclosed. The system includes an array of emitter antenna and receiver antenna elements, a controller configured to control the modulation of transmitting and received signals, and a monitoring processor configured to receive a signal quality input based on the transmitting and received signal, generate a control profile based on the signal quality input, compare at least one control profile to at least one of a predicted result signal or to control profiles from at least two other sets of control profiles, and determine a faulty set of individually addressable components that includes at least one faulty individually addressable component. The controller is configured to enhance one or more individually addressable components to compensate for the faulty addressable component.

16 Claims, 7 Drawing Sheets

(56) References Cited

U.S. PATENT DOCUMENTS

2012/0169540 A1* 7/2012 Jones ................. G01S 13/4463
                                                    342/372
2019/0013583 A1* 1/2019 Paulsen .................... H01Q 3/36
2020/0049751 A1* 2/2020 Salazar Cerreno ....... G01S 7/40
2020/0358179 A1 11/2020 Eriksson
2022/0395325 A1* 12/2022 Hancock ............ A61B 18/1815

OTHER PUBLICATIONS

Extended European Search Report dated Aug. 30, 2023; European Application No. 23169544.6.

\* cited by examiner

ASSURANCE MONITORING OF RADAR SYSTEMS

BACKGROUND

Flight vision systems used in low visibility are typically only permitted in conditions with sufficient natural visibility such that a loss of the vision system at critical flight phases (e.g., flare, touchdown, rollout) can be conducted safely. Due to the potentially hazardous nature of a malfunctioning flight vision system during critical phases, vision systems in fault tolerant environments often operate with zero tolerance for degraded performance or fault conditions. Improvements in radar technologies have increased the range and quality of flight vision system performance in poor or contested visibility. However, the need for fault tolerance to an operational state is critical to take advantage of these improvements in increasingly lower visibilities. For example, for a flight vision system that is able to 'see' perfectly under low visibility (e.g., zero-zero) conditions, a failure of the flight vision system at 100' above ground level (AGL) may leave the pilot unable to see well enough to perform either a landing or a go-around. As a result, regulations typically limit use of such systems to conditions and operations which permit safe visual recovery if such a failure occurs. Flight vision systems and related systems are often checked and calibrated pre-flight, but are not checked during normal fight leaving open a risk of flight vision system failure that could result in potentially catastrophic consequences. Therefore, it is desirable to provide a system and/or method that avoids the shortcomings of the use of flight vision systems in flight.

SUMMARY

A method for performing a self-diagnostic test on an electronically scanned array (ESA) configured with individually addressable components is disclosed. In one or more embodiments, the method includes designating at least one of a first set, a second set, or a third set of individually addressable components. In one or more embodiments, the method further includes transmitting a test signal through at least one of transmit path or return path of one or more individually addressable components of each set of individually addressable components. In one or more embodiments, the method further includes transmitting a signal quality input from one or more individually addressable components of each set of individually addressable components to a monitoring processor. In one or more embodiments, the method further includes generating a control profile for each respective set of individually addressable components based on the signal quality input. In one or more embodiments, the method further includes comparing at least one control profile to at least one of a predicted result signal or to control profiles from at least two other sets of individually addressable components. In one or more embodiments, the method further includes determining a faulty set of individually addressable components that includes at least one faulty individually addressable component.

In one or more embodiments of the method, the method further includes comprising comparing the control profile of the first set of individually addressable components to the control profiles of the second set of individually addressable components and the third set of individually addressable components.

In one or more embodiments of the method, the method further includes comprising comparing the control profile of the first set of individually addressable components to the predicted result signal.

In one or more embodiments of the method, the method further includes enhancing one of the individually addressable components to compensate for the faulty individually addressable component.

In one or more embodiments of the method, the method further includes designating four or more sets of individually addressable components.

In one or more embodiments of the method, the test signal is transmitted by an emitter antenna and a reflected test signal is received by a receiver antenna.

In one or more embodiments of the method, the individually addressable component comprises at least one of the emitter antenna or the receiver antenna.

In one or more embodiments of the method, the individually addressable component comprises the emitter antenna and the receiver antenna.

In one or more embodiments of the method, the test signal is configured as a first calibration waveform, that is differentiated by the ESA from an operating waveform.

In one or more embodiments of the method, the method includes another test signal configured as a second calibration waveform that is differentiated by the ESA from both the operating waveform and the first waveform.

A radar system is also disclosed. In one or more embodiments, the radar system includes an emitter antenna configured to transmit a test signal. In one or more embodiments, the radar system further includes a receiver antenna configured to receive the test signal, wherein the test signal has been reflected. In one or more embodiments, the radar system further includes an analog circuitry comprising an analog output component set and an input analog component set, the analog circuitry configured to transmit test signals between the emitter antenna, the receiver antenna, and a digital circuitry. In one or more embodiments, the radar system further includes the digital circuitry configured to transmit test signals between the analog circuitry and at least one of a monitoring processor and a controller comprising the monitoring processor. In one or more embodiments, the monitoring processor is configured to receive a quality signal input. In one or more embodiments, the monitoring processor is further configured to generate a control profile based on the signal quality input. In one or more embodiments, the monitoring processor is further configured to compare at least one control profile to at least one of a predicted result signal or to control profiles from at least two other sets of individually addressable components. In one or more embodiments, the monitoring processor is further configured to determine a faulty set of individually addressable components that includes at least one faulty individually addressable component. In one or more embodiments, the radar system further includes the controller. In one or more embodiments, the controller includes one or more processors and a memory. In one or more embodiments, the memory stores instructions that are executed by the one or more processors. In some embodiments, the instructions include designating at least one of a first set, a second set, or a third set of individually addressable components. In some embodiments, the instructions further include transmit the test signal through at least one of transmit path or return path of one or more individually addressable components of each set of individually addressable components. In some embodiments, the instructions further include enhancing one or more individually addressable components to compensate for the faulty individually addressable component.

In one or more embodiments, the radar system includes a master control module communicatively coupled to one or more controllers.

In one or more embodiments, the signal quality input includes control data from the analog circuitry.

In one or more embodiments, the signal quality input includes control data from the digital circuitry.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A system and method for assurance monitoring of radar systems are disclosed. The radar systems may include electronically scanned antenna (ESA)-based systems, such as ESA systems used in vision systems or enhanced flight vision systems (EFVS). The system and method may utilize internal (e.g., digital) methods for monitoring radar components, external (e.g., analog) methods for monitoring radar components, or a hybrid method that combines both external and internal methodology. The system and method make particular use of designating ESA elements into groups that are functionally compared to each other to determine ESA element health, and potentially recover full operational functionality based on that determination. The system and method lower the risk of failure of an enhanced flight vision system during low visibility operations, and may result in expanded regulatory approvals for operations in decreased visibility conditions down to zero-zero.

Figure 1A:
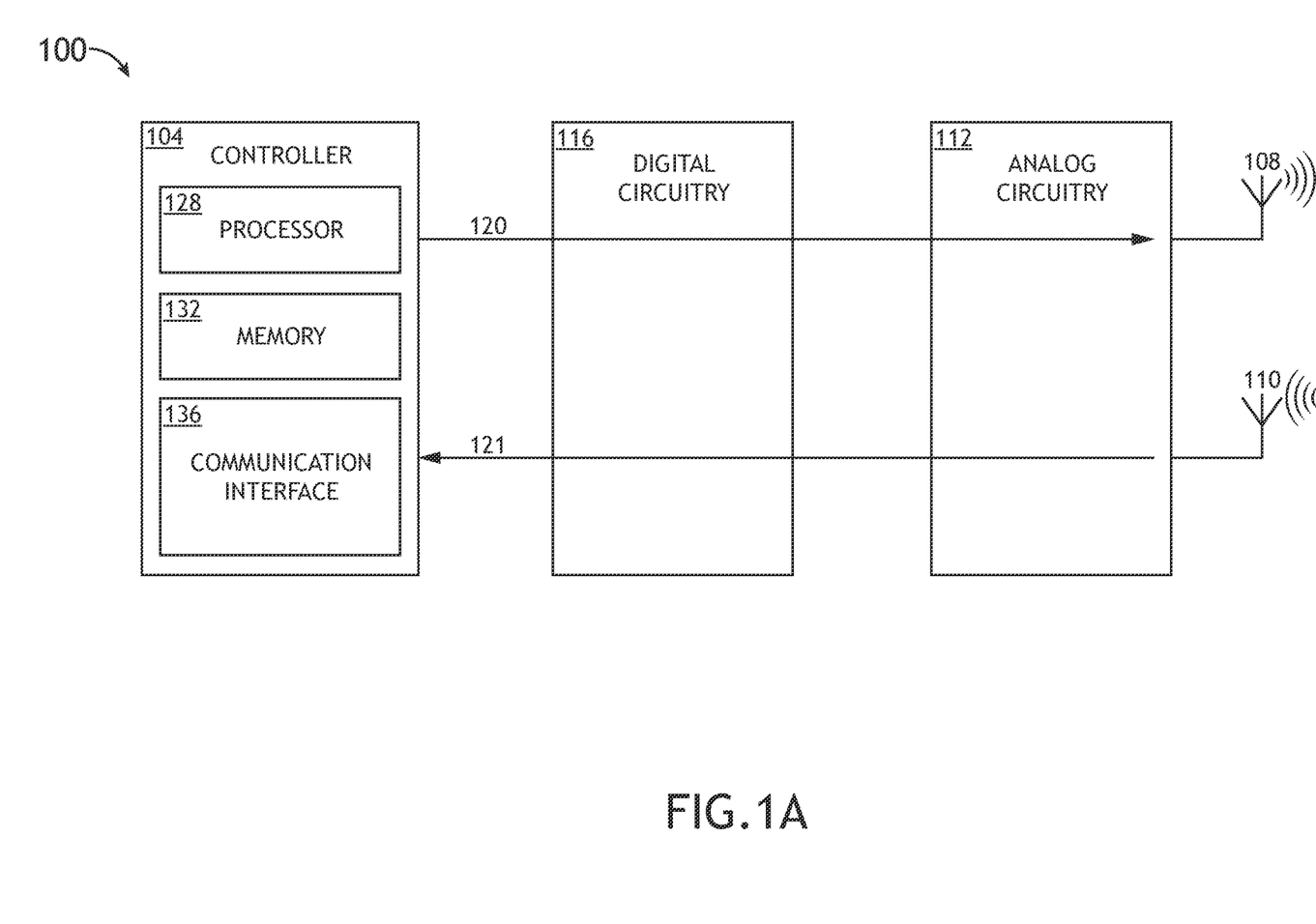
FIG. 1A is a block diagram illustrating a radar system, in accordance with one or more embodiments of the disclosure.

FIG. 1A is a block diagram illustrating a radar system 100, in accordance with one or more embodiments of the disclosure. The radar system 100 performs at least the basic functions of synthesizing, modulating, and transmitting a digital signal through a transmitting antenna, as well as using a receiving antenna to collect reflected energy, wherein the resultant signal from the reflected energy is demodulated, and digitized for processing.

The radar system 100 may be configured as any type of arrayed radar system or phased-array radar system including but not limited to active electronically scanning arrays (AESA) and passive electronically scanning arrays. The radar system 100 includes a controller 104 configured to perform the processing functionality as described herein, emitter antennas 108 and receiver 110 configured to send and receive radio frequency (RF) signals, respectively, and analog circuitry 112 configured to modify incoming RF signals received from the receive antenna 110 and outgoing RF signals to be transmitted from the emitter antenna 108. The radar system 100 further includes digital circuitry 116 that converts the incoming RF signals to a digital signal and converts outgoing digital signals to an analog signal. The digital circuitry 116 may include, or may be integrated into, the controller 104 or vice versa. The signals within the radar system generally move along a transmit path 120 whereby forward signals (e.g., signals to be transmitted) initiated from the controller 104 pass through the digital circuitry 116 and the analog circuitry 112, and are transmitted from the emitter antenna 108 as a transmitted RF signal. Return signals (e.g., signals received by the receiver antenna 110) generally move along a receive path 121 through the analog circuitry 112 and the digital circuitry 116 to the controller 104.

Figure 1B:
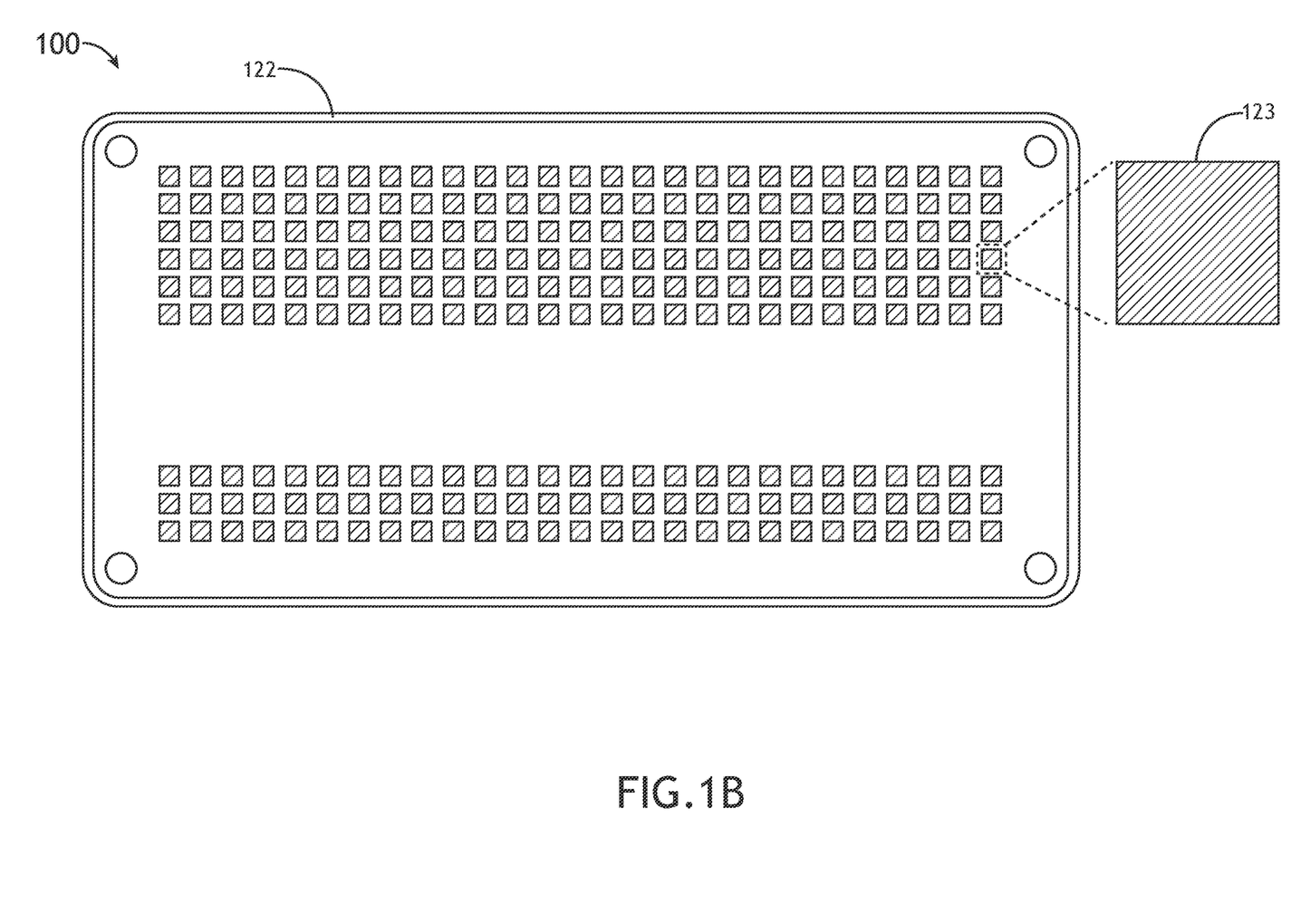
FIG. 1B illustrates an antenna of a radar system, in accordance with one or more embodiments of the disclosure.

FIG. 1B illustrates a face 122 of a radar system 100 that includes arrays of individually addressable components 123 indicated by gray squares upon the face 122. Each individually addressable component 123 is configured to function either fully or partially to transmit and/or receive an RF signal. For example, the emitter antenna 108 and the receiver antenna 110 each may be designated separately, or tandemly, as individually addressable components 123 of the radar system 100, and each individually addressable component 123 may be independently controlled by the controller 104. For example, an ESA configured with 100 emitter antenna 108 and receiving antenna 110 pairs may be considered to have 100 individually addressable components 123. In another example, the emitter antenna 108 and receiving antenna 110 may each be considered a separate individually addressable pair. For example, an ESA configured with 100 emitter antennas 108 and receiving antennas 110 may be considered to have 200 individually addressable components 123.

Figure 1C:
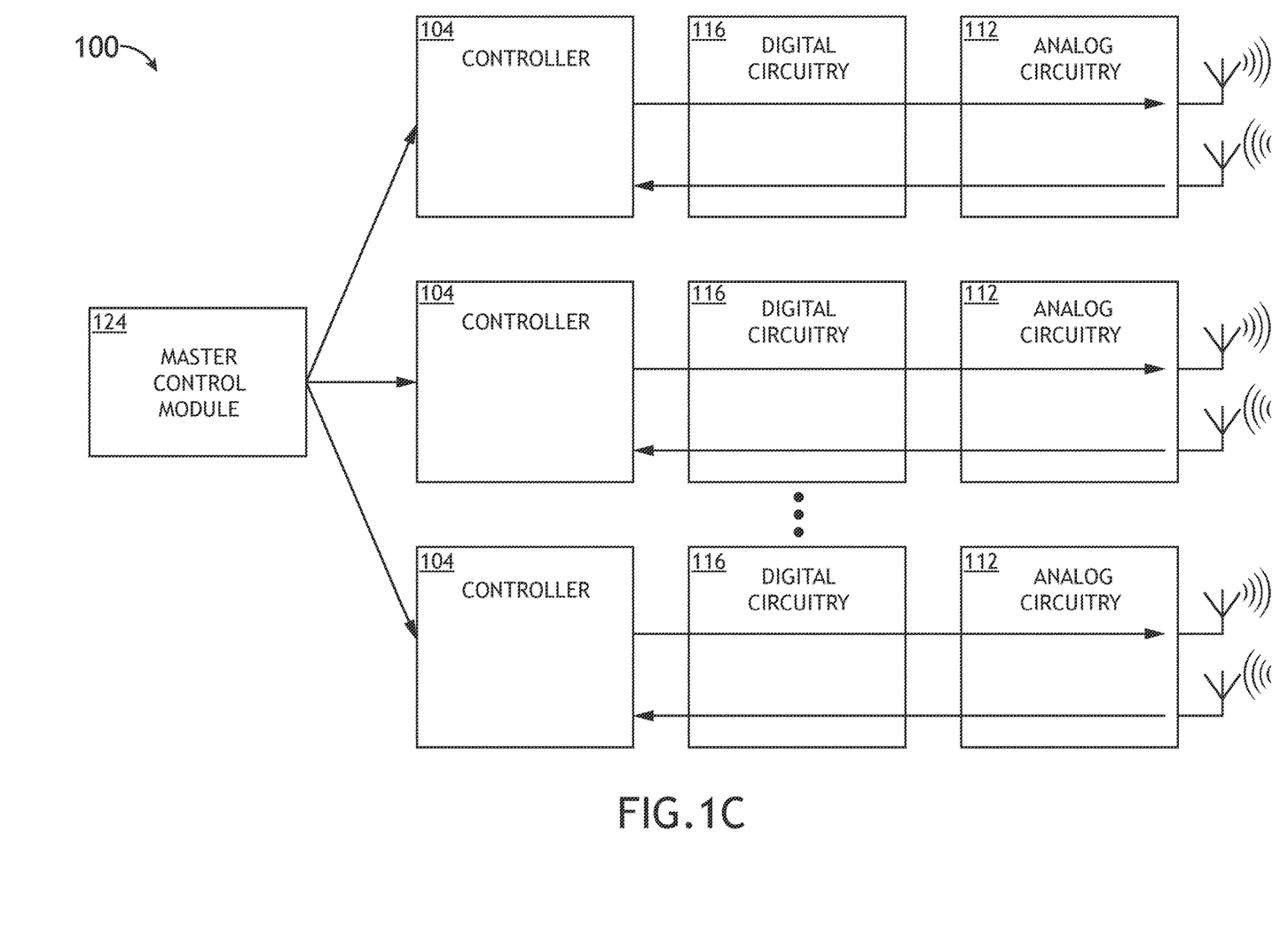
FIG. 1C is a block diagram illustrating a radar system that includes a master control module, in accordance with one or more embodiments of the disclosure.

The individually addressable component 123 may include any componentry of the radar system 100. For example, an individually addressable component 123 may include the emitter antenna 108 (e.g., and/or receiver antenna 110) and one or more components of the analog circuitry 112. In another example, the individually addressable component 123 may include the emitter antenna 108 (e.g., and/or receiver antenna 110) and one or more components of the digital circuitry 116. In another example, the individually addressable component 123 may include the emitter antenna 108 (e.g., and/or receiver antenna 110), one or more components of the digital circuitry 116, and one or more components of the analog circuitry 112. In another example, the individually addressable component 123 may include the emitter antenna 108 (e.g., and/or receiver antenna 110) and the controller 108, or a controller-like component with processing ability. For instance, a radar system 100 may include a master control module 124 communicatively coupled to multiple controllers 104 and capable of controlling the function of one or more controllers, as shown in FIG. 1C, in accordance with one or more embodiments of the disclosure.

The controller 108 comprises one or more processors 128, a memory 132, and a communication interface 136. The one or more processors 128 may include any processor or processing element known in the art. For the purposes of the present disclosure, the term "processor" or "processing element" may be broadly defined to encompass any device having one or more processing or logic elements (e.g., one or more micro-processor devices, one or more application specific integrated circuit (ASIC) devices, one or more field programmable gate arrays (FPGAs), or one or more digital signal processors (DSPs)). In this sense, the one or more processors 128 may include any device configured to execute algorithms and/or instructions (e.g., program instructions stored in memory 132). In one embodiment, the one or more processors 128 may be embodied as a desktop computer, a flight computer, mainframe computer system, workstation, image computer, parallel processor, networked computer, or any other computer system configured to execute a program configured to operate the radar system 100 or components of the radar system 100, as described throughout the present disclosure. Moreover, different subsystems of the radar system 100 may include a processor or logic elements suitable for carrying out at least a portion of the steps described in the present disclosure. Therefore, the above description should not be interpreted as a limitation on the embodiments of the present disclosure but merely as an illustration.

The memory 132 can be an example of tangible, computer-readable storage medium that provides storage functionality to store various data and/or program code associated with operation of the controller 104 and/or other components of the radar system 100, such as software programs and/or code segments, or other data to instruct the controller 104 and/or other components to perform the functionality described herein. Thus, the memory 132 can store data, such as a program of instructions for operating the radar system 100 or related components. It should be noted that while a single memory 132 is described, a wide variety of types and combinations of memory 132 (e.g., tangible, non-transitory memory) can be employed. The memory 132 can be integral with the controller, can comprise stand-alone memory, or can be a combination of both. Some examples of the memory 132 can include removable and non-removable memory components, such as a programmable logic device, random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 136 can be operatively configured to communicate with components of the controller 104 and other components of the radar system 100. For example, the communication interface 136 can be configured to retrieve data from the controller 104 or other components, transmit data for storage in the memory 132, retrieve data from storage in the memory 132, and so forth. The communication interface 136 can also be communicatively coupled with controller 104 and/or system elements to facilitate data transfer between system components.

Figure 2:
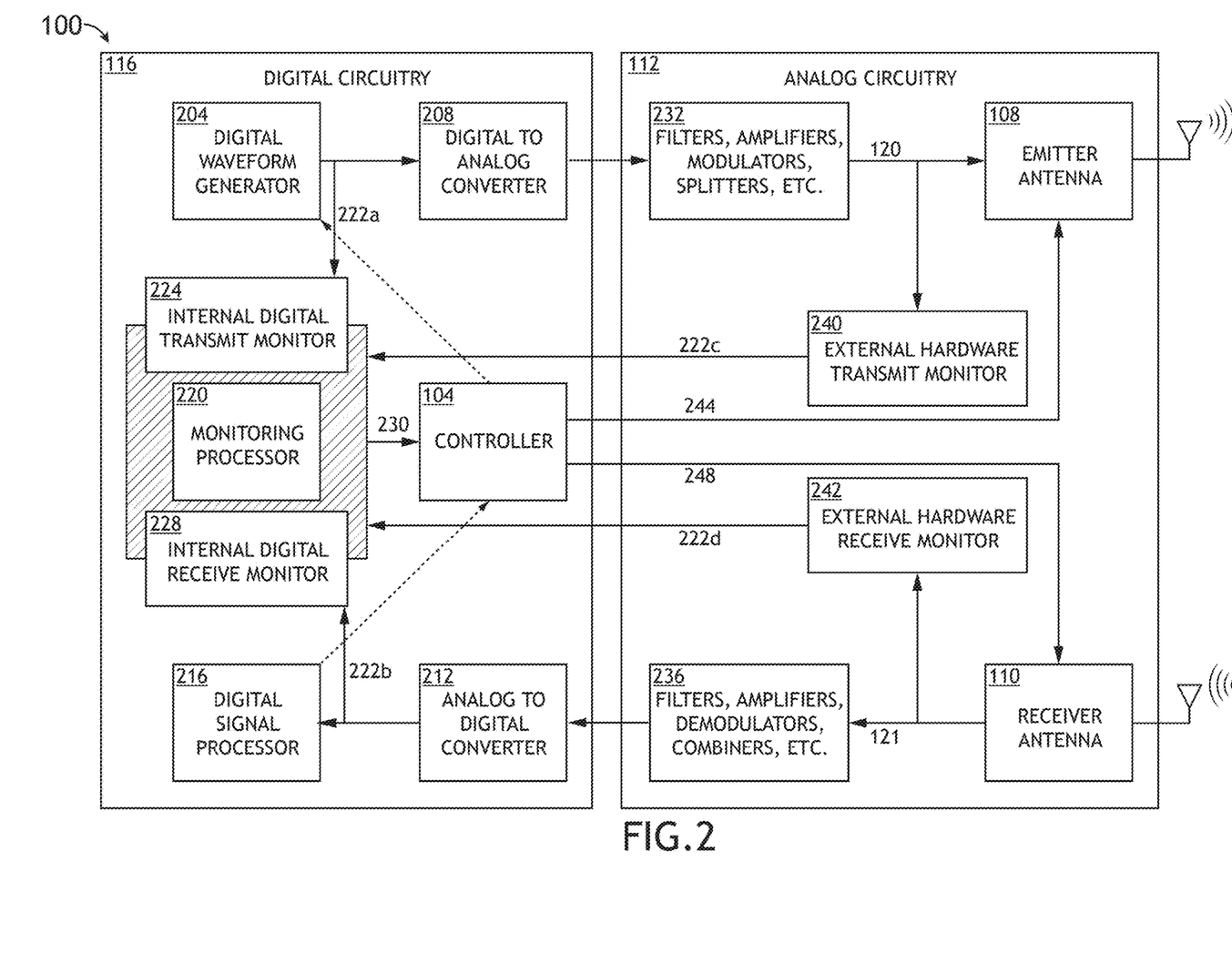
FIG. 2 is a block diagram illustrating a detailed organization of the radar system, in accordance with one or more embodiments of the disclosure.

FIG. 2 is a block diagram illustrating a detailed organization of the radar system 100, in accordance with one or more embodiments of the disclosure. The controller 104 and the digital circuitry 116 are shown as combined onto a same block, indicating that the controller 104 and the digital circuitry 116 may share the same circuit board (e.g., printed circuit board (PCB), the same chip system (e.g., a chipset), or the same integrated circuit. For example, the controller 104 and the digital circuitry 116 may be included within a single FPGA.

The digital circuitry 116 includes a digital waveform generator 204 configured to generate a forward signal for transmission. For example, the forward signal may be configured as a control signal used for testing the radar system 100. The digital circuitry 116 further includes a digital-analog converter (DAC) 208 communicatively coupled to the digital waveform generator 204 configured to convert the forward signal from a digital signal to an analog signal. The digital circuitry 116 further includes an analog to digital converter (ADC) 212 configured to receive an analog return signal from the analog circuitry 112 and convert the analog return signal into a digital return signal. The digital circuitry further includes a digital signal processor 216 communicatively coupled to the ADC 212 and configured to measure, filter, compress, and/or modify the incoming digital signal from the ADC 212 into a signal operationally readable by componentry within the radar system 100.

In embodiments, the digital circuitry 116 further includes a monitoring processor 220 configured to monitor the functional capabilities of one or more individually addressable components 123 of the radar system 100 (e.g., configured with controller-like processors 128, memory 132, and communication interfaces 136) and communicatively coupled to the controller 104 and one or more components of the digital circuitry 116. The monitoring processor 220 may receive one or more signal quality inputs via signal quality paths 222*a*-*d*. For example, the monitoring processor 220 may be configured to receive a signal quality input from the digital waveform generator 204 (e.g., via signal quality path 222*a* and an internal digital transmit monitor 224). In another example, the monitoring processor may be configured to receive input from the digital signal processor 216 (e.g., via the signal quality path 222*b* and an internal digital receive monitor 228). Once the signal quality inputs are processed by the monitoring processor 220, the monitoring processor 220 may send a controller signal 230 to the controller 104 that includes data and/or instructions on testing, organizing, or otherwise using individually addressable components 123, or sets of individually addressable components 123. In some embodiments, the monitoring processor 220, or processors performing one or more functions of the monitoring processor 220 is disposed on the master control module 124, which is communicatively coupled to the multiple controllers 104. In some embodiments, the controller 104 may include, or may integrate, the monitoring processor 220.

The analog circuitry 112 may include an analog output component set 232 that includes the RF componentry necessary to send an analog transmit signal from the DAC 208 to the emitter antenna 108 via the transmit path 120 (e.g., the path running from the controller 104 and/or monitoring processor 220 to the emitter antenna 108). The analog output component set 232 may include any type of RF componentry including but not limited to filters, amplifiers, modulators, and splitters. The analog circuitry may also include an analog input component set 236 that include the RF componentry necessary to send the analog return signal from the receiver antenna 110 to the ADC 212 via the receive path 121 (e.g., the path running from the receiver antenna 110 to the controller 104 and/or monitoring processor 220). The analog input component set 236 may include any type of RF componentry including but not limited to filters, amplifiers, demodulators, and combiners. The analog circuitry 116 may also be communicatively coupled to the monitoring processor 220. For example, the monitoring processor 220 may be configured to receive input from an external hardware transmit monitor 240 (e.g., via signal quality path 222*c*) that is communicatively linked to the transmit path 120. In another example, the monitoring processor may be configured to receive input from an external hardware receive monitor 242 (e.g., via signal quality path 222*d*) that is communicatively linked to the analog return signal 238.

In some embodiments, measurements made by the monitors (e.g., the internal digital transmit monitor 224, the internal digital receive monitor 228, the external hardware transmit monitor 240, and the external hardware receive monitor 242) can be compared to each other (via the monitoring processor 220) to verify system performance. Any discrepancies would indicate a fault in the radar system 100, and appropriate action could be taken to automatically reconfigure the antenna elements, or other componentry of the radar system to minimize the impact of the fault.

In embodiments, the controller 104 is coupled to the emitter antenna 108 via a controller emitter path 244 configured to deliver emitter instructions to the emitter antenna 108. The emitter instruction may include various instructions related to the functionality of the emitter antenna 108 including but not limited to ON/OFF switching and transmission power levels. The controller is also coupled to the receiver antenna 11 via a controller receiver path 248 configured to deliver receiver instructions related to the functionality of the receiver antenna 110 including but not limited to ON/OFF switching and receive gain levels.

It should be understood that the controller 104 may be configured to receive direct input from one or more components of the digital circuitry and/or analog circuitry 112 without the input passing through the monitoring processor. For example, the controller 104 may operate to change the signaling pathway of the transmit path 120 or the receive path 121 to include the monitoring processor at a predetermined time or under specific conditions, such as unexpected loss of function within the radar system 100.

The signal quality inputs received by the monitoring processor 220 (via the internal digital transmit monitor 224, the internal digital receive monitor 228, the external hardware transmit monitor 240, and the external hardware receive monitor 242) are utilized to generate a control profile indicating a functional ability of the corresponding individually addressable components 123. Analysis may include one or more sets of the signal quality inputs to the monitoring processor 220. For example, to test the digital circuitry 116 of the radar system 100, the monitoring processor 220 may compare a signal quality input to the internal digital transit monitor 224 (e.g., a digitized signal from the transmit path 120) to a signal quality input to the internal digital receive monitor (e.g., a digitized signal from the receive path 121) to generate a digital control profile. In another example, to test the analog circuitry 112 of the radar system 100, the monitoring processor 220 may compare a signal quality input to the external hardware transmit monitor (e.g., an analog signal from the transmit path 120) to a signal quality input to the external hardware receive monitor (e.g., an analog signal from the receive path 121) to generate an analog control profile. In another example, signal quality inputs from any two or more monitors (e.g., the internal digital transmit monitor 224, the internal digital receive monitor 228, the external hardware transmit monitor 240, and/or the external hardware receive monitor 242) are compared to generate a hybrid control profile capable of testing the digital circuitry 116 and/or the analog circuitry 112 simultaneously.

The radar system 100 may be configured to compare any set of monitored signals to each other to determine the functional ability of the individually addressable components 123, whether the monitored signals arise from the digital circuitry 116 or the analog circuitry 112. For example, digital monitoring signals received for one individually addressable component 123 may be compared to the digital monitoring signals for another individually addressable component 123. In another example, analog monitoring signals received for one individually addressable component 123 may be compared to the analog monitoring signals for another individually addressable component 123. In another example, digital monitoring signals received for one individually addressable component 123 may be compared to the analog monitoring signals for another individually addressable component 123, and vice versa.

Each monitor 240, 242, 224, 228 is capable of monitoring specific aspects of the radar system 100. For example, the internal digital transmit monitor 224 monitors the digital transmission signal near the point where the digital transmission signal is generated. In another example, the external hardware receive monitor 242 monitors analog signals from the receiver antenna 110 at a point within the receive-related analog circuitry 112. In another example, the internal digital receive monitor 228 monitors the digitized receive signal at a point after the analog signal has been converted. In another example, the external hardware transmit monitor monitors the analog transmit signal at a point before the signal is transmitted from the emitter antenna 108.

The multiple comparisons between the signals received from monitors 240, 242, 224, 228, particularly comparisons between the analog circuitry 112 signaling and digital circuitry 116 signaling, allow the radar system 100 to detect and diagnose a variety of problems within the radar system 100. For example, a comparison of a digital transmit signal to a digital receive signal may limit the analysis to the detection of a fault somewhere in the signal chain, while a comparison of an analog transmit signal to an analog receive signal may limit the analysis to issues with the transmit/receive elements themselves, depending on where the monitor is placed in the analog circuitry 112. However, a comparison of digital transmission signals to analog transmission signals, and/or a comparison of digital receive signals to analog receive signals may narrow down the location of the fault to within a few components on either the transmit path 120 or the receive path 121. Narrowing the location of the fault to a few components in the transmit and/or receive signal path is be may be useful for maintenance and/or repair so that the faulty components may be identified precisely and replaced accordingly.

It should be understood that the monitoring processor 220 may receive multiple sets of signal quality inputs from the digital circuitry 116 and/or the analog circuitry 112 that are not listed in this disclosure. For example, signal quality inputs may be retrieved from several points along the transmit path 120 and receive path 121 as needed to ensure that the circuitry and componentry of the radar system 100 are functioning correctly. The radar system may also include any number of monitors for monitoring the digital circuitry 116 and the analog circuitry 112. Therefore, the above descriptions should be considered not as a limitation, but as an illustration.

In some embodiments, the control profile of an individually addressable component 123, or a group of individually addressable components 123 of the radar system 100, is compared to two other control profiles from two other individually addressable components 123, or groups of individually addressable components 123 of the radar system 100. The comparisons between control profile from different individually addressable components 123 or between different groups of individually addressable components 123 may be performed by the monitoring system (e.g., the monitoring processor 220 functioning as a signal comparator). Individually addressable components 123 that operate dissimilarly (e.g., have a different control profile) to two or more individually addressable components 123 (e.g., the two or more individually addressable components having similar control profiles between each other) may be designated as faulty. Correspondingly, a group of individually addressable components 123 with different control profiles than two other groups of individually addressable components 123 may be designated as a faulty group having one or more faulty individually addressable components 123.

Upon an identification of faulty individually addressable components 123 or groups with faulty individually addressable components 123, the radar system 100 may adjust operating parameters of either the faulty or non-faulty individually addressable components 123 to compensate for the loss of function. For example, for a faulty individually addressable component 123 with a failing, but not failed emitted signal, the controller 104 may send an instruction via the controller emitter path 244 instructing the analog circuitry increase the power to the emitter antenna 108. In another example, if the monitoring processor 220 detects that the ADC 212 has failed (e.g., due to a single event effect), the controller 104 may shut down the receiver antenna 110 or reroute the receive path 121 through a standby ADC 212 available on the FPGA. In another example, a function of a failing individually addressable component 123 may be compensated by increasing power to, or otherwise optimizing/enhancing, neighboring individually addressable components 123. In another example, a function of a group of individually addressable components that include at least one failing individually addressable component 123 may be compensated by increasing power to, or otherwise optimizing/enhancing, neighboring individually addressable components 123 outside of the group.

Figure 3A:
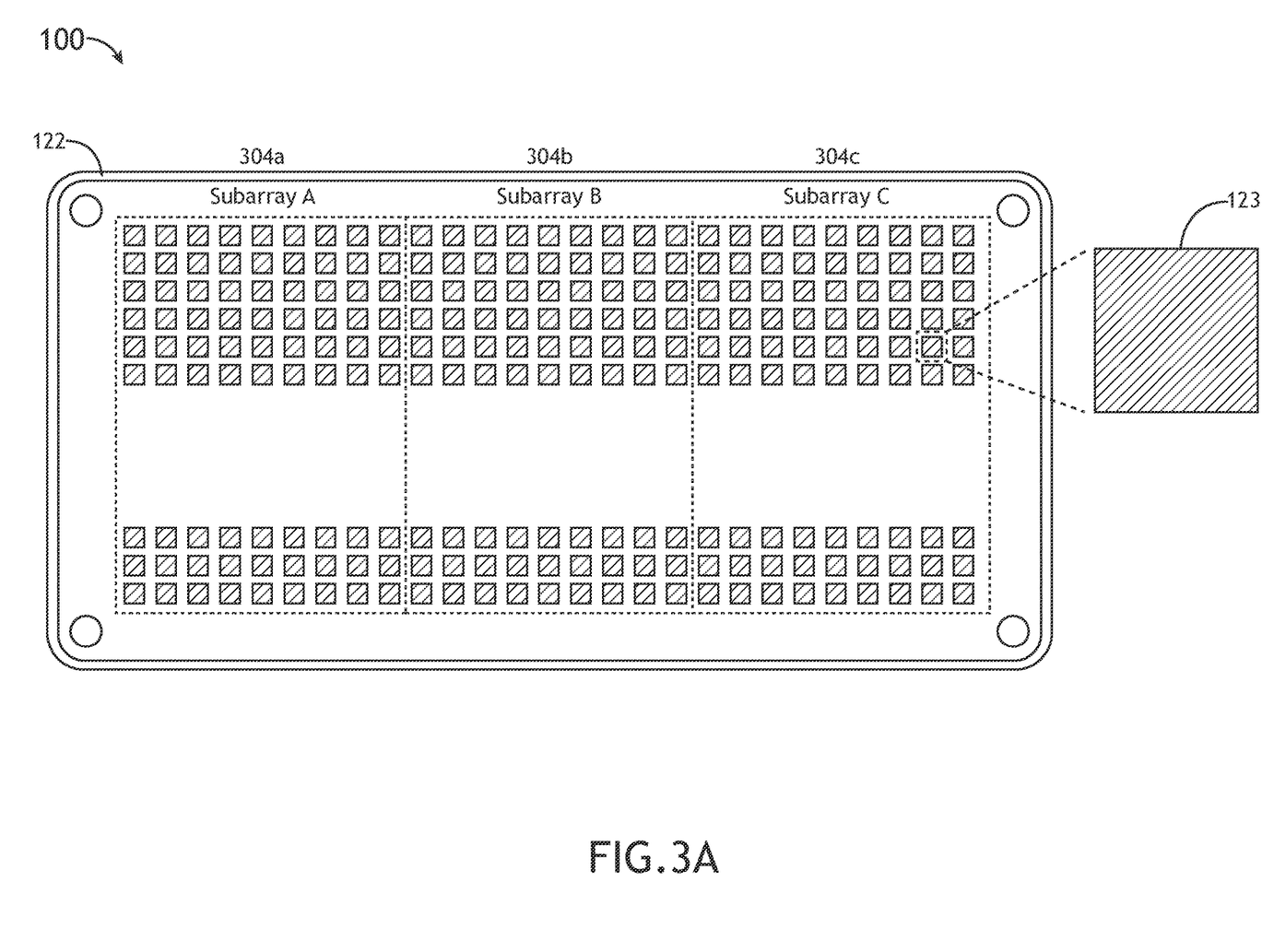
FIG. 3A illustrates a face of the radar system with subarray markings, in accordance with one or more embodiments of the disclosure.
Figure 3B:
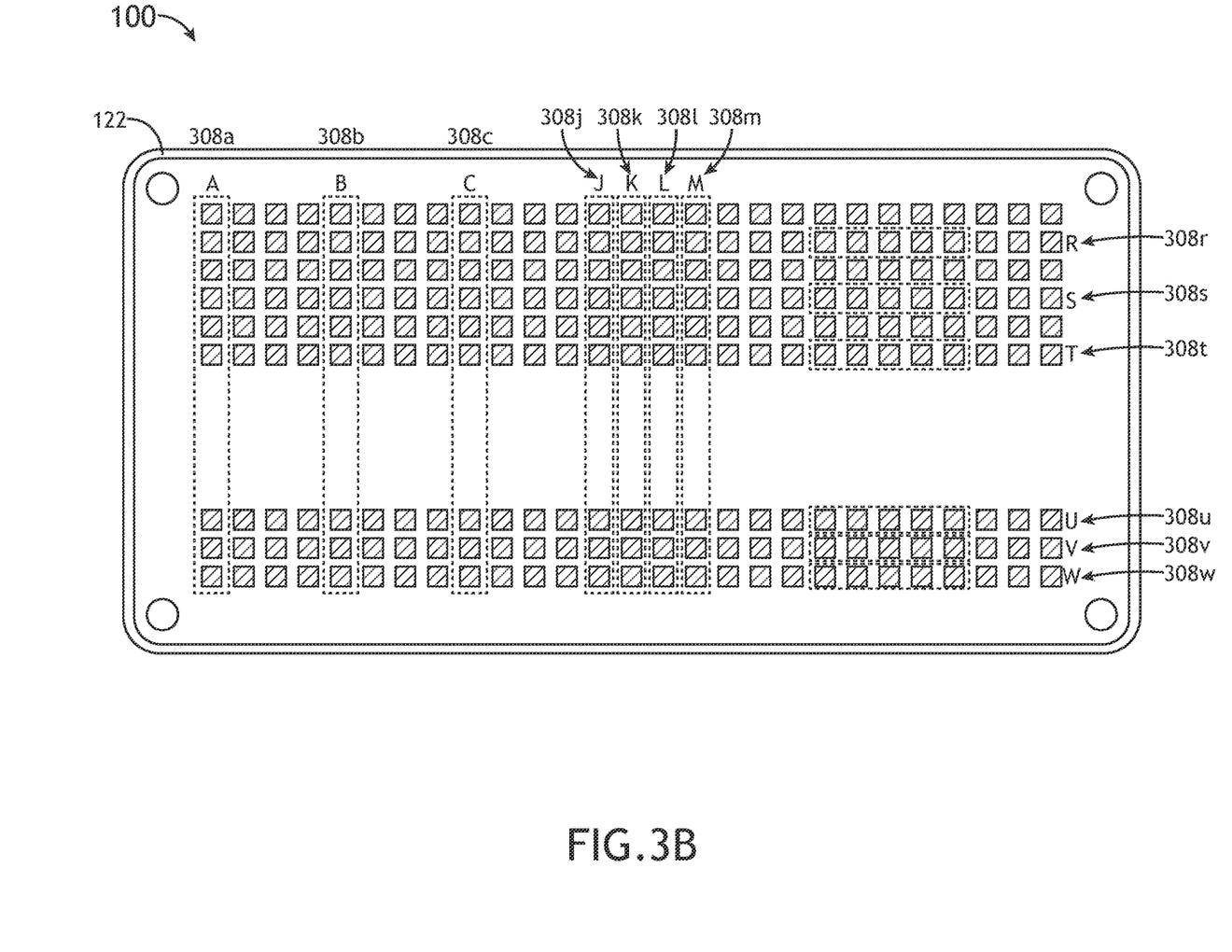
FIG. 3B illustrates a face of the radar system with group markings, in accordance with one or more embodiments of the disclosure.

The individually addressable components may be organized in any type of set (e.g., subarray or group), such as those shown in FIGS. 3A-B, in accordance with one or more embodiments of the disclosure. For example, and as shown in FIG. 3A, the array of individually addressable components 123 may be organized into three subarrays (304a-c). This arrangement allows each subarray (e.g., such as subarray 304A) to be compared to the control profile of the other two subsets 304B-C. For instance, if two subarrays 304b-c haves equivalent or near equivalent control profiles, and one of the subarrays 304a differs to both of the other subarrays 304b-c, then it is highly likely that the differing subarray 304a has at least one faulty individually addressable component 123. To compensate for this fault, the controller 104, monitoring processor 220 and/or master control module 124 may optimize/enhance the functionality of one or more addressable components 123 in subarrays 304a-c. For example, for a loss of power fault in subarray 304a, the controller 104 may cause a compensating increase in power in subarray 304b.

Several combinations of groupings 308a-w of individually addressable components 123 are shown in FIG. 3B, in accordance with one or more embodiments of the disclosure. For example, the groupings 308a-c may include alternating vertical columns of individually addressable components 123. In another example, the groupings 308j-m may include adjacent columns of individually addressable components 123. In another example, the groupings 308r-t may include alternating horizontal rows of individually addressable components. In another example, the groupings 308u-w may include adjacent horizontal rows of individually addressable components 123. As described herein, the groupings/subarrays of individually addressable components may be of any number (e.g., greater than two) and of any configuration, as the shape, number, and size of the groupings/subarrays is arbitrary and optimized/enhanced depending on antenna configuration, specific application of the radar system 100 and monitoring requirements. A group 308 or subarray 304 may be represented by a single individually addressable component.

Figure 4:
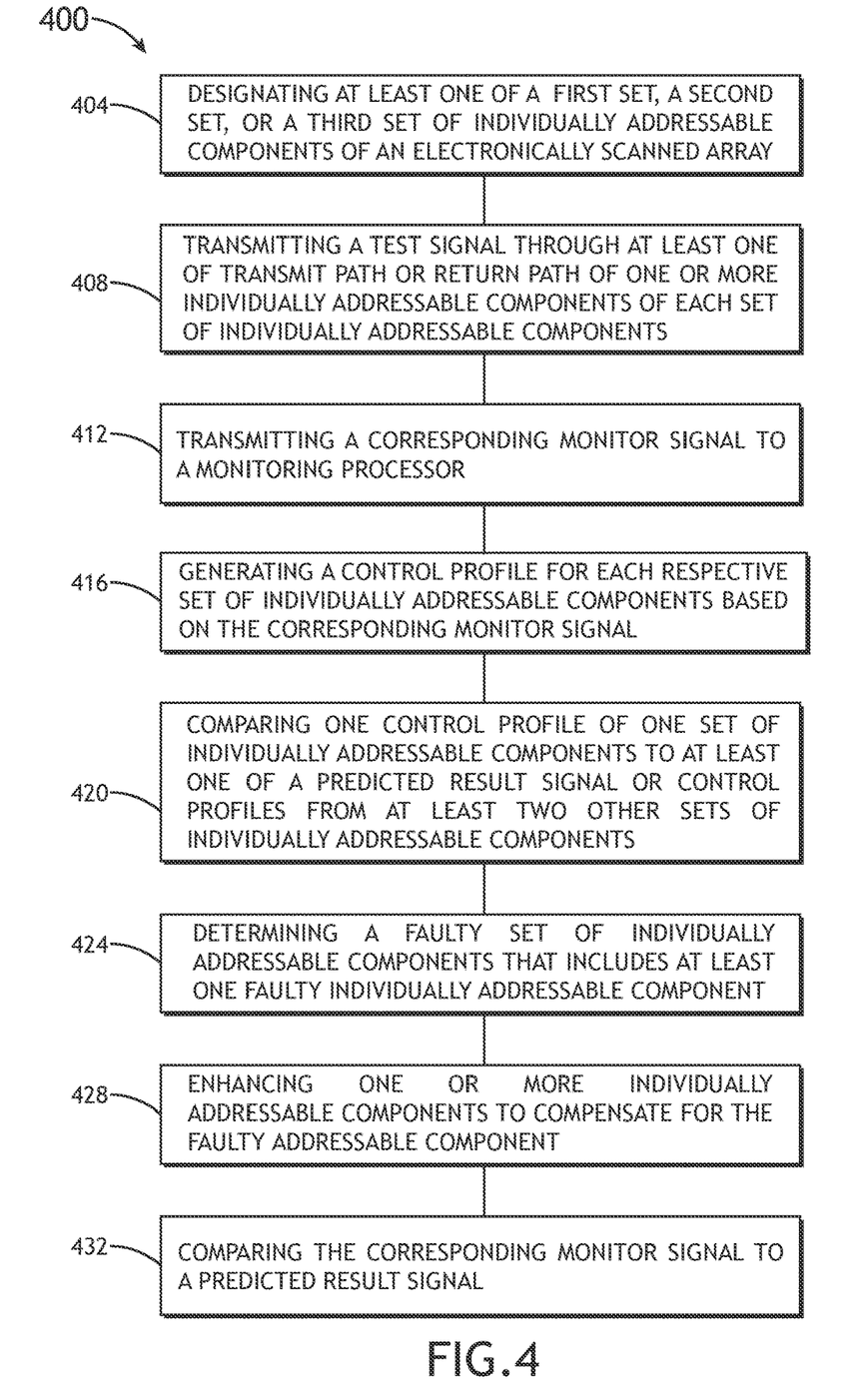
FIG. 4 is a flowchart illustrating a method for performing self-diagnostic test on the radar system (e.g., ESA) configured with the individually addressable components, in accordance with one or more embodiments of the disclosure.

FIG. 4 is a flowchart illustrating a method 400 for performing self-diagnostic test on the radar system 100 (e.g., ESA) configured with the individually addressable components 123, in accordance with one or more embodiments of the disclosure. The method 400 may be performed during a mission (e.g., for an ESA of an aircraft while the aircraft is in the air), or while maintenance is being performed on the aircraft on the ground.

In some embodiments, the method 400 includes a step 404 of designating at least one of a first set, a second set, or a third set of individually addressable components 123. For example, the controller 104, monitoring processor 220 and/or master control module 124 may be programmed to, or may instruct radar system 100 componentry to, designate three groups 308 or subarrays 304 within the radar system 100 such as or similar to the designations shown in FIGS. 3A-B. In some embodiments, the method 400 includes designating four or more sets.

In some embodiments, the method 400 includes a step 408 of transmitting a test signal through a transmit path 120 and/or receive path 121 of one or more individually addressable components 123 of each set of individually addressable components 123. The signal may be configured as a forward signal or a return signal, depending on the component of the radar system 100 being tested, and may include any type of signaling form, such as a control signal, that will be eventually returned as a signal quality input to the monitoring processor 220. The signal may be initiate via the controller 104, the monitoring processor 220 the master control module 124 or via other componentry within, or outside, the radar system 100.

In some embodiments, the method 400 further includes a step 412 of transmitting a signal quality input to the monitoring processor 220. The signal quality input may include any type of signal or signaling that is a consequence or, or a returning signal of, the test signal. For example, the monitoring processor 220 may receive a signal quality input initially sent to the internal digital transmit monitor 224. In another example, the monitoring processor may receive a signal quality input initially sent to the external hardware receive monitor. The monitors 224, 228, 240, 242 may function to retrieve signals/data from the transmit path 120 and/or receive path, may function to detect specific details of the test signal based on the retrieved signals/data, and/or may function to relay raw signal and/or retrieved signals/data to the monitoring processor 220.

In one or more embodiments, the method 400 further includes a step 416 of generating a control profile for each respective set of individually addressable components 123 based on the signal quality input or sets of signal quality inputs. For example, the monitoring processor 220 may create a digital control profile for a single emitter antenna 108/receiver antenna 110 pair (e.g., a single individually addressable component 123) based on received signal quality inputs from the internal digital transmit monitor 224 and the internal digital receive monitor 228. The generation of control profiles can be expanded so that entire subarrays 304 or groups 308 of individually addressable components 123 may be assigned a control profile. For example, a subarray 304 group control profile may be generated by the summation of control profiles generated for each individually addressable component 123 of the subarray 304. In another example, the subarray group profile may be generated based on a summation of data of received signal quality inputs (e.g., a monitor processor 220 directly communicatively coupled to a set of individually addressable components 123.

In some embodiments, the method 400 further includes a step 420 of comparing one control profile of one set of individually addressable components 123 to control profiles from at least one of a predicted result signal or control profiles from at least two other sets of individually addressable components 123. For example, and as shown in FIG. 3A, the designated subarrays a-c, each having an independently generated control profile, are compared to each other. In another example, the control profile of a single individually addressable component, containing data from a signal quality input, may be compared to a predicted result signal. This comparison process may be performed by the monitoring processor 220, the controller, or by processors in the master control module 124.

In some embodiments, the predicted signal may be configured as a previously characterized signal, or test signal, that has been stored for comparison as a reference in flight. For example, the predicted signal may include test patterns, with responses to test patterns previously determined (e.g., at a factory or during setup/maintenance) while the radar system 100 is working correctly. This predicted signal may then be stored in memory 132 for later comparisons to actual operations in flight.

In some embodiments, the method 400 further includes a step 424 of determining a faulty set of individually addressable components 123 that includes at least one faulty individually addressable component 123. For example, when comparing the control profiles of three subarrays 304a-c, the processors 128 within the radar system 100 may determine that while two of the subarrays 304b-c are quite similar, one subarray 304a has a control profile that is quite different. The radar system 100 may then determine that that the different subarray is faulty.

In some embodiments, the method 400 further includes a step 428 of optimizing/enhancing one or more individually addressable components 123 to compensate for the faulty individually addressable component 123. For example, as in reference to FIG. 3A, if subarray 308a is determined to have a faulty addressable component 123 (e.g., having a single emitting antenna 108 that is emitting a weak signal), the radar system 100 may be configured to send a signal via the controller emitter path 244 to 1) subarray 308b, 2) one or more individually addressable components 123 in subarray 308b, or 3) one or more adjacent individually addressable components 123 in subarray 308a to increase transmitting power to compensate for the loss of transmit signal in the faulty individually addressable component 123. The radar system 100 may also send an instruction to the faulty individually addressable component to boost power as a possible fix. It should be understood that in all monitor arrangements disclosed herein, a reduction in performance due to faulty componentry or signal interference would be reported as a fault (e.g., as a message to a central maintenance system). These self-correcting methods and mechanisms may include specifications such that a modified/optimized/enhanced configuration of the radar system 100 remaining in operation after a failure would still meet minimum performance requirements to complete the flight or mission, such as a specified low visibility operation.

Minimum thresholds may be defined for performance and quantity of operational components required for fail-operational versus fail-passive system modes.

Once faults are detected, upon landing, the fault may then be addressed at a next appropriate service interval. The steps of method 400 may be performed by any software, hardware, or firmware-based techniques for comparison-making, profile generation, fault determination, and optimization/enhancement purposes.

In some embodiments, the method 400 may include a step 432 of comparing the signal quality input to a predicted result signal. For example, the test signal may produce an expected, or predicted result (e.g., the predicted result signal), when the individually addressable component 123 is functioning correctly. Deviations of a signal quality input from a predicted result signal may result in an action by the radar system 100 without requiring a comparison to other subarrays 304 or groups 308. For example, a signal quality input sent via the external hardware receive monitor 242 that reports zero incoming signal (e.g., indicative of a damages/lost receiver antenna 110), may result in an action based on that result without the need to compare the signal quality input to other individually addressable components via a control profile.

As described herein, the method 400 may be used to test specific aspects or componentry of the radar system 100. For example, the method 400 may be used to test only the digital circuitry 116 of the radar system 100. For instance, the method 400 may be used to compare the control profile based on the internal transmit monitor 224 (e.g., testing the digital waveform generator 204 component) and/or the internal digital receive monitor 228 (e.g., testing the digital signal processor 216 and/or the ADC 212 components). In another example, the method 400 may be used to test only the analog circuitry 112 of the radar system 100. For instance, the method 400 may be used to compare control profile of the external hardware transmit monitor 240 (e.g., testing one or more components of the analog output component set 232) and/or the external hardware receive monitor 242 (e.g., testing one or more components of the analog input component set 236). In another example, the method 400 may combine both the testing of the digital circuitry 116 and the analog circuitry 112 (the monitoring of the digital circuitry 116 and the analog circuitry 112 are not mutually exclusive, and can be performed simultaneously). As described herein, signals received by any monitor/sensor monitors (e.g., the internal digital transmit monitor 224, the internal digital receive monitor 228, the external hardware transmit monitor 240, and the external hardware receive monitor 242) are subsequently transmitted to the monitoring processor 220.

In some embodiments, the test signal may be configured as a signal that can individually interrogate componentry disposed on either the transmit path 120 or the receive path 121 using a naturally or synthetic reflectance pattern from inside a radome that may partially or entirely enclose the radar system 100. For example, on the transmit path 120, the emitter antenna 108 of each individually addressable component 123 may be individually activated for a brief period, and an array of receiving antennas 110 may, in aggregate, analyze the reflectance pattern to isolate under-performing emitter antennas 108. In another example, on the receive path 121, each receiver antenna 110 could be individually enabled to receive a constant signal emitted by one or more emitting antennas 108, which would be used to identify underperforming components. Different combinations of transmit and receive component pairs could be monitored in a sequence to test all components. For example, a testing scheme could include sequentially testing componentry as part of a continuous Built-in-Test (BIT) function or on-command as part of an initiated BIT.

In some embodiments, the radar system 100 may monitor componentry continuously while in operating mode (e.g., a standard operating mode, wherein the ESA is being used for providing vision functions during flight). For example, one or more emitting antennas 110 would emit, or be instructed to emit, the test signal (e.g., a first test signal or a first calibration waveform) which would differ, or be differentiated, from the standard operation waveform used by the currently non-tested emitting antennas 110 in an identifiable way. One or more selected receiving antennas 110 would receive the reflected test signal and then analyze the returned energy (e.g., the signal quality input) to extract a calibration pattern, which would be cross-compared to other emitter antenna 108/receiver antenna 110 pairs, as disclosed in step 420, or prior known data, as disclosed in step 432. In some embodiments, different test signals/calibration waveforms (e.g., a second test signal configured as a second calibration waveform) could be used simultaneously to test multiple emitter antennas 108 and/or receive antennas 110 at once. The number of components tested components may be limited to ensure interference from calibration waveforms does not degrade system performance below minimum operating standards.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A method for performing a self-diagnostic test on an electronically scanned array (ESA) configured with individually addressable components comprising:

designating at least one of a first set, a second set, or a third set of individually addressable components;

transmitting a test signal through at least one of transmit path or return path of one or more individually addressable components of each set of individually addressable components, wherein the test signal is configured as a first calibration waveform that is differentiated by the ESA from an operating waveform;

transmitting a signal quality input from one or more individually addressable components of each set of individually addressable components to a monitoring processor;

receiving a signal quality input from an internal digital receive monitor that is configured to monitor analog signals from a receiver antenna at a point within an analog circuitry;
generating a control profile for each respective set of individually addressable components based on the signal quality input;
comparing at least one control profile to at least one of a predicted result signal or to control profiles from at least two other sets of individually addressable components; and
determining a faulty set of individually addressable components that includes at least one faulty individually addressable component, wherein the test signal is transmitted by an emitter antenna and a reflected test signal is received by a receiver antenna, wherein the test signal has been reflected by a natural or synthetic reflectance from inside a radome that partially or entirely encloses a radar system, wherein each individually addressable component may be individually activated, and an array of receiving antennas, in aggregate, analyzes a reflectance pattern to isolate an under-performing emitter antenna of the at least one faulty individually addressable component.

2. The method of claim 1, further comprising comparing the control profile of the first set of individually addressable components to the control profiles of the second set of individually addressable components and the third set of individually addressable components.

3. The method of claim 1, further comprising comparing the control profile of the first set of individually addressable components to a predicted result signal.

4. The method of claim 1, further comprising enhancing one of the individually addressable components to compensate for the faulty individually addressable component.

5. The method of claim 1, further comprising designating four or more sets of individually addressable components.

6. The method of claim 1, wherein the test signal is transmitted by an emitter antenna and a reflected test signal is received by a receiver antenna.

7. The method of claim 6, wherein the individually addressable component comprises at least one of the emitter antenna or the receiver antenna.

8. The method of claim 6, wherein the individually addressable component comprises the emitter antenna and the receiver antenna.

9. The method of claim 1, wherein the method is performed continuously while the ESA is in operating mode.

10. The method of claim 9, wherein the method includes another test signal configured as a second calibration waveform that is differentiated by the ESA from both the operating waveform and the first waveform.

11. The method of claim 1 further comprising:
receiving a signal quality input from the internal digital transmit monitor;
generating a control profile based on the signal quality input from the internal digital transmit monitor;
receiving a signal quality input from a external hardware transmit monitor;
generating a control profile based on the signal quality input from the external hardware transmit monitor;
comparing the control profile from the internal hardware transmit monitor to the control profile from the external hardware transmit monitor from at least two other sets of individually addressable components; and
determining a faulty set of individually addressable components based on a comparison of the control profile from the internal hardware receive monitor to the control profile from the external hardware receive monitor that includes at least one faulty individually addressable component.

12. The method of claim 1, wherein the radar system monitors componentry continuously while in operating mode, wherein one or more emitter antennas emit a test signal that is differentiated from a standard operation waveform.

13. A radar system comprising:
an emitter antenna configured to transmit a test signal;
a receiver antenna configured to receive the test signal, wherein the test signal has been reflected, wherein the test signal is configured as a first calibration waveform that is differentiated by the radar system from an operating waveform;
an internal digital receive monitor configured to monitor a digital receive signal from a receive path based on the test signal;
an external hardware receive monitor configured to monitor analog signals from a receiver antenna;
a monitoring processor configured to receive signals from the external hardware digital receive monitor, the monitoring processor configured to:
receive a signal quality input from the internal digital receive monitor that is configured to monitor analog signals from a receiver antenna at a point within an analog circuitry;
generate a control profile for each respective set of individually addressable components based on the signal quality input;
compare at least one control profile to at least one of a predicted result signal or to control profiles from at least two sets of individually addressable components; and
determine a faulty set of individually addressable components that includes at least one faulty individually addressable component, wherein the test signal is transmitted by an emitter antenna and a reflected test signal is received by a receiver antenna, wherein the test signal has been reflected by a naturally or synthetic reflectance from inside a radome that partially or entirely encloses a radar system, wherein each individually addressable component may be individually activated, and an array of receiving antennas, in aggregate, analyzes a reflectance pattern to isolate an under-performing emitter antenna of the at least one faulty individually addressable component; and
a controller communicatively coupled to the monitoring processor, the controller comprising:
one or more processors; and
a memory with instructions stored upon, the instructions, when executed by the one or more processors, causing the one or more processors to:
designate at least one of a first set, a second set, or a third set of individually addressable components;
receive data from the monitoring processor; and
enhance one or more individually addressable components to compensate for the faulty individually addressable component, based on the data from the monitoring processor.

14. The system of claim 13, wherein the radar system further includes a master control module communicatively coupled to one or more controllers.

15. The system of claim 13 further comprising:
an internal digital transmit monitor configured to monitor a digital transmit signal from a transmit path based on the test signal; and
an external hardware transmit monitor configured to monitor analog signals from a receiver antenna, wherein the monitoring processor is further configured to receive signals from the internal digital transmit monitor and the external hardware digital transmit monitor, the monitoring processor configured to:
receive a signal quality input from the internal digital transmit monitor;
generate a control profile based on the signal quality input from the internal digital transmit monitor;
receive a signal quality input from the external hardware transmit monitor;
generate a control profile based on the signal quality input from the external hardware transmit monitor;
compare the control profile from the internal hardware transmit monitor to the control profile from the external hardware transmit monitor from at least two other sets of individually addressable components; and
determine a faulty set of individually addressable components based on a comparison of the control profile from the internal hardware receive monitor to the control profile from the external hardware receive monitor that includes at least one faulty individually addressable component.

16. The radar system of claim 13, wherein the radar system monitors componentry continuously while in operating mode, wherein one or more emitter antennas emit a test signal that is differentiated from a standard operation waveform.

* * * * *